Patented Aug. 3, 1926.

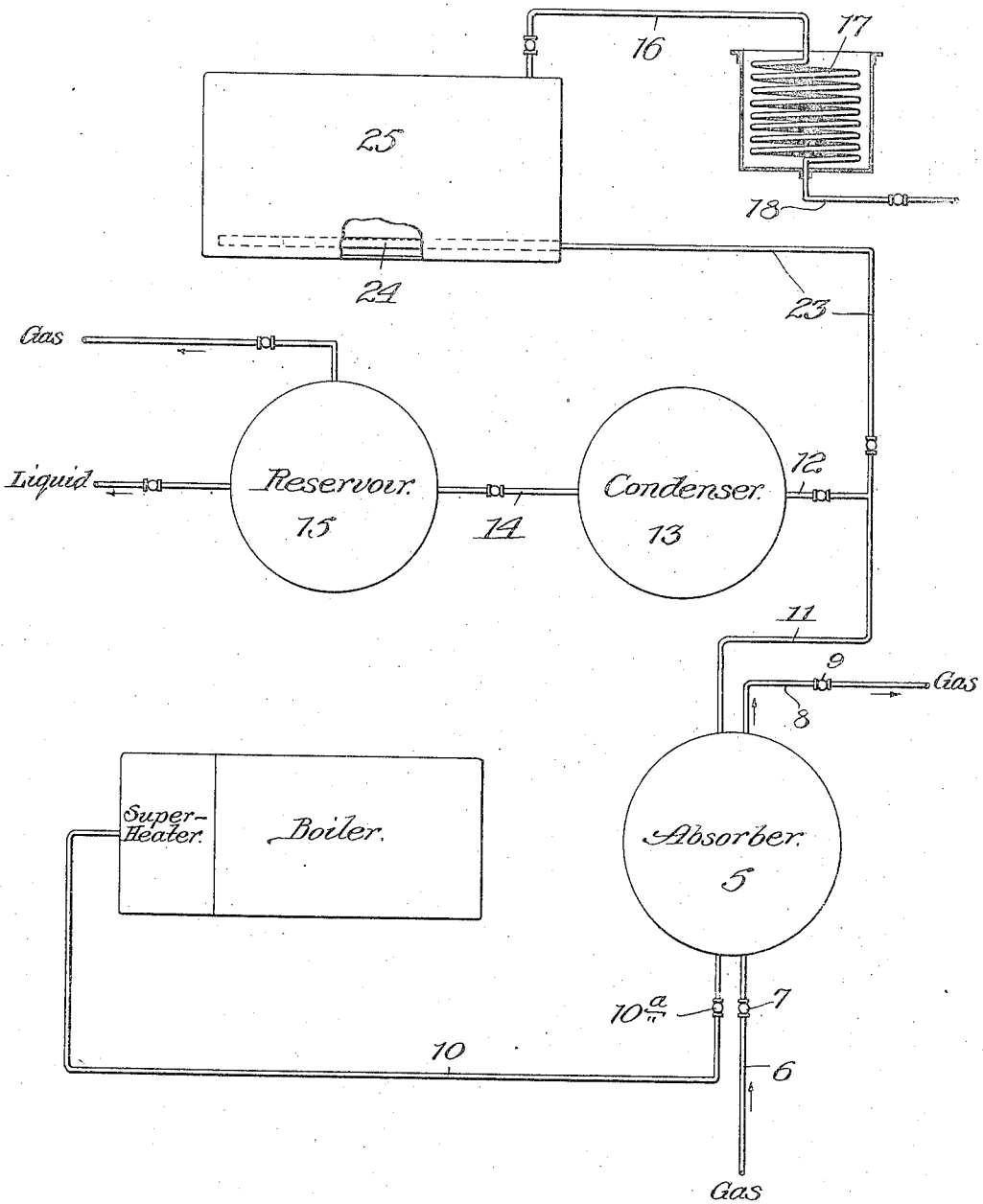

1,594,915

UNITED STATES PATENT OFFICE.

HORACE M. WEIR, OF ELIZABETH, NEW JERSEY, ASSIGNOR TO STANDARD DEVELOPMENT COMPANY, A CORPORATION OF DELAWARE.

ART OF PRODUCING GASOLINE.

Application filed April 8, 1921. Serial No. 459,711.

The present invention relates to improvements in the manufacture of gasoline from natural gas and other gases containing gasoline constituents in vapor form. It will be fully understood from the following description, which is illustrated by the accompanying drawing, in which apparatus suitable for carrying out the invention is diagrammatically illustrated.

Referring more particularly to the drawings, the numeral 5 indicates an absorber for the gasoline constituents of the gas undergoing treatment, which may suitably be filled with activated charcoal, silica gel or other suitable absorbing agent. The gas to be treated enters the absorber through line 6 provided with valve 7 and the denuded gas passes out of the absorber through line 8 provided with valve 9.

After the absorbing agent in the absorber has absorbed a proper amount of gasoline constituents from the gas passing through it, the flow of gas is cut off and superheated steam is passed into the absorber through pipe 10 controlled by valve 10ª. The temperature of the superheated steam may suitably be about 300° C. The superheated steam drives off the gasoline constituents from the activated charcoal or other absorbent in the absorber and mixed steam and vapors pass out of the absorber through pipe 11. If desired, they may be passed directly through pipe 12 into a condenser 13, from which the condensed products and cooled gases pass through pipe 14 into receiver 15 in which they are separated. In accordance with the present invention, however, the steam and vapor issuing from the absorber are passed through pipe 11 to pipe 23 by which they are introduced into the perforated pipe or coil 24 in the bottom of a steam still 25, which may suitably be charged with a crude naphtha containing a graduated range of gasoline and heavier constituents. The vapors from the still 25 pass off through pipe 16 to a condenser 17, pass through pipe 18 into from which they a suitable separating receptacle, not shown.

The crude naphtha which is charged into the still 25 is a distillate which may contain from 25 to 60% of gasoline together with heavier constituents, for example, of the character of kerosene or naphtha bottoms. A suitable stock may have, for example, a density of about 51° Baumé and a maximum boiling point of approximately 500° F. and showing about 50% off at 374° F.

After the superheated steam has been admitted to the absorber 5 the vapors issuing therefrom pass through pipes 11 and 23 into the steam still 25, which is charged with to a stock of the character described. A steam distillation of the stock is thereby produced and its lighter constituents are driven off through pipe 16. At the same time the gasoline vapors contained in the mixed vapors entering the steam still from the absorber pass off through the vapor line 16 and carry with them sufficient of the heavier constituents of the stock in still 25 to produce a properly blended gasoline. A complete recovery and simultaneous blending of the gasoline vapors issuing from the absorber is thereby effected. The vapors passing off from the still 25 are condensed in the worm 17 and pass through the pipe 18 to a suitable receptacle, where they are separated into their constituents by gravity.

It is readily apparent that heated gases or vapors other than steam may be employed as the carrier of the gasoline from the charcoal in the present process; for example, nitrogen, carbondioxide or light hydrocarbon gases, such as methane, "high line gas" from pressure stills, etc.

Although the present invention has been described in connection with the specific details of apparatus suitable for carrying it into effect, it is not intended that these details shall be regarded as limitations upon the scope of the invention except in so far as included in the following claims.

I claim:

1. The process of manufacturing gasoline which comprises effecting the absorption of gasoline constituents of a gas in a suitable absorbent, subsequently heating the absorbent to drive out the gasoline constituents absorbed therein, passing the said gasoline constituents in vapor form through a body of hydrocarbon oil distillate containing gasoline and heavier constituents and condensing and collecting vapors evolved therefrom.

2. The process of manufacturing gasoline which consists in absorbing gasoline constituents from the gas by means of a solid absorbent, subsequently passing heated gas through the said absorbent, thereby driving off the vapors of the gasoline constituents absorbed therein, passing the combined gas and gasoline vapors through a body of hydrocarbon oil distillate containing gasoline and heavier constituents and condensing and collecting vapors evolved therefrom.

3. The process of manufacturing gasoline which consists in absorbing gasoline constituents from the gas by means of a solid absorbent, subsequently passing superheated steam through the said absorbent, thereby driving off the vapors of the gasoline constituents absorbed therein, passing the combined steam and gasoline vapors through a body of hydrocarbon oil distillate containing gasoline and heavier constituents and condensing and collecting vapors evolved therefrom.

4. The process of manufacturing gasoline which comprises effecting the absorption of gasoline constituents of a gas in a suitable solid absorbent, subsequently heating the absorbent to drive out the gasoline constituents absorbed therein, passing the said gasoline constituents in vapor form through a body of heated hydrocarbon oil distillate containing gasoline and heavier constituents and condensing and collecting the vapors evolved therefrom.

HORACE M. WEIR.